United States Patent
Booth

[11] Patent Number: 6,002,645
[45] Date of Patent: Dec. 14, 1999

[54] SELF SURVEY OF RANDOM ARRAYS

[75] Inventor: Newell O. Booth, San Diego, Calif.

[73] Assignee: The United States of America as represented by the Secretary of the Navy, Washington, D.C.

[21] Appl. No.: 06/880,467

[22] Filed: Jun. 30, 1986

[51] Int. Cl.[6] ........................................... G01S 3/80
[52] U.S. Cl. ........................... 367/123; 367/126; 367/127
[58] Field of Search ..................... 367/118, 123, 367/129, 127, 122, 125, 126; 342/196, 375, 380, 383

[56] References Cited

U.S. PATENT DOCUMENTS 4,559,605  12/1985  Norsworthy ............................. 367/122

*Primary Examiner*—Thomas H. Tarcza
*Assistant Examiner*—Daniel T. Pihulic
*Attorney, Agent, or Firm*—Harvey Fendelman; Michael A. Kagan; John Stan

[57] ABSTRACT

A method for determining the positions of the N array elements of a random array to an accuracy sufficient to accomplish beam forming is provided where the initial positions of the array elements are known to an accuracy of $\lambda_{min/2}$, and where $\lambda_{min}$ is the wavelength of the highest frequency of any of the M cohering sources which are in the field of the array and where the relative directions are unknown. The method includes the steps of: identifying M cohering sources in the field of the array, each of which emits at least one narrowband frequency, each frequency differing from the adjacent frequency by 1/T, where T is the time period of the measurements; a device for measuring the true bearing of one of the M sources; receiving the M cohering signals at the N array elements; performing a Fast Fourier Transform (FFT) on each of the N element signals; examining the spectrum of each of the N received signals; and from the N spectra, selecting M (M>3) lowest angular frequencies, $\omega_p$ with the strongest signals.

The method also includes at each $\omega_p$ forming the cross coherence matrix using the formula $$\Gamma_{p,mn} = \frac{\langle p_m A_{pn}^* \rangle}{\frac{1}{N}\sum_{n=1}^{N}\langle A_{pn}A_{pn}^* \rangle} \quad (1)$$

where $A_{pn}$ is the complex Fourier coefficient from element n, the symbol pair indicating time average for each of the M Frequencies, $\omega_p$; obtaining the equation $$\Gamma_{p,mn} = \exp J\, p/c[k_p-(\vec{r}_m - \vec{r}_n)] \quad (2)$$

where $r_i$ is the vector position of the ith element, c is the speed of propagation and $\hat{k}_p$ is the unit length direction vector of the pth cohering source; testing and discarding data where Equation (2) is satisfied for all element pairs with the same $\hat{k}_p$; and solving the overdetermined set of Equations (2) for the unknown $\vec{r}_i$ and $\hat{k}_p$.

2 Claims, 4 Drawing Sheets

*Simplified Beam-Forming Array*

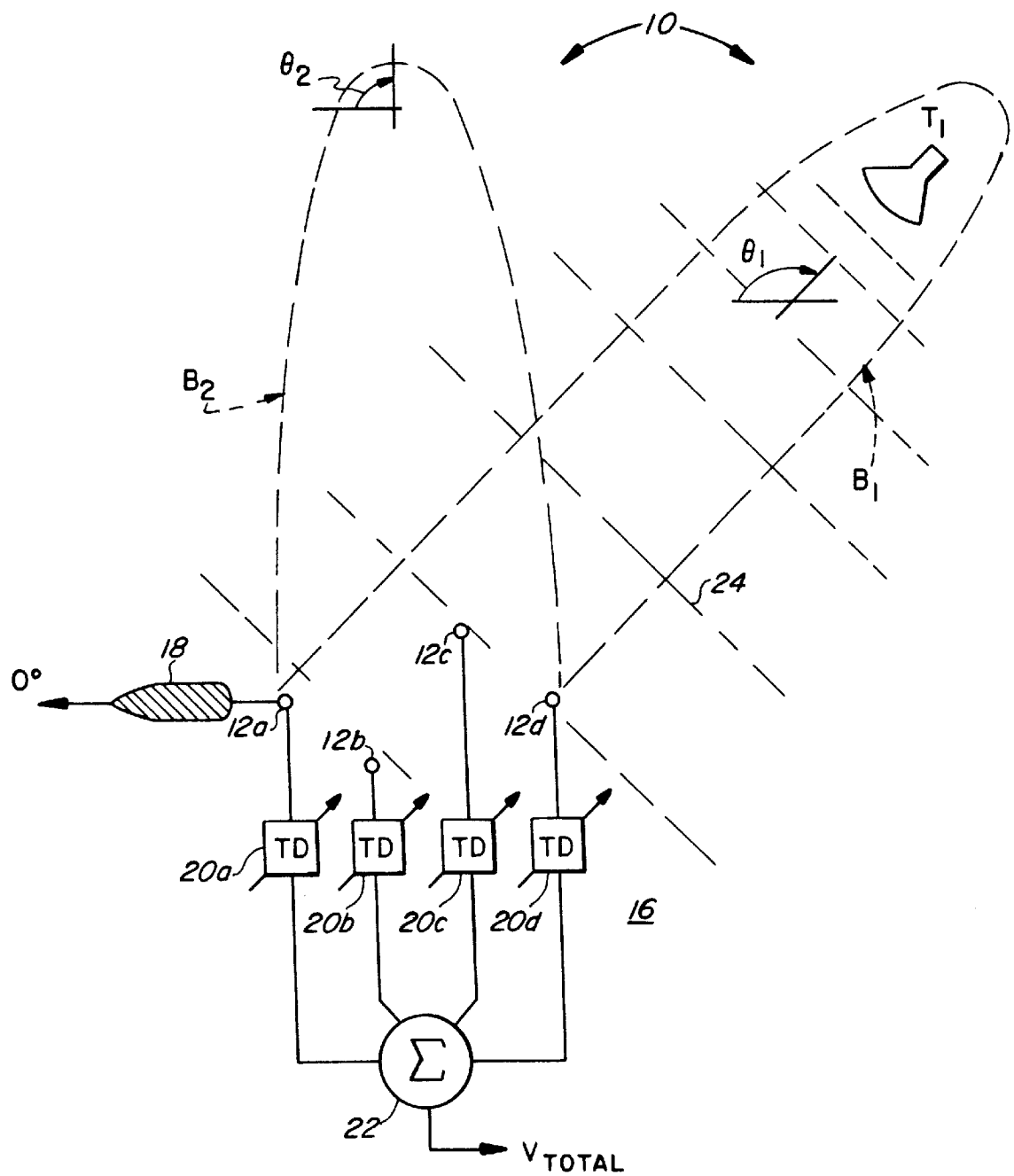
FIG. 1 Simplified Beam-Forming Array

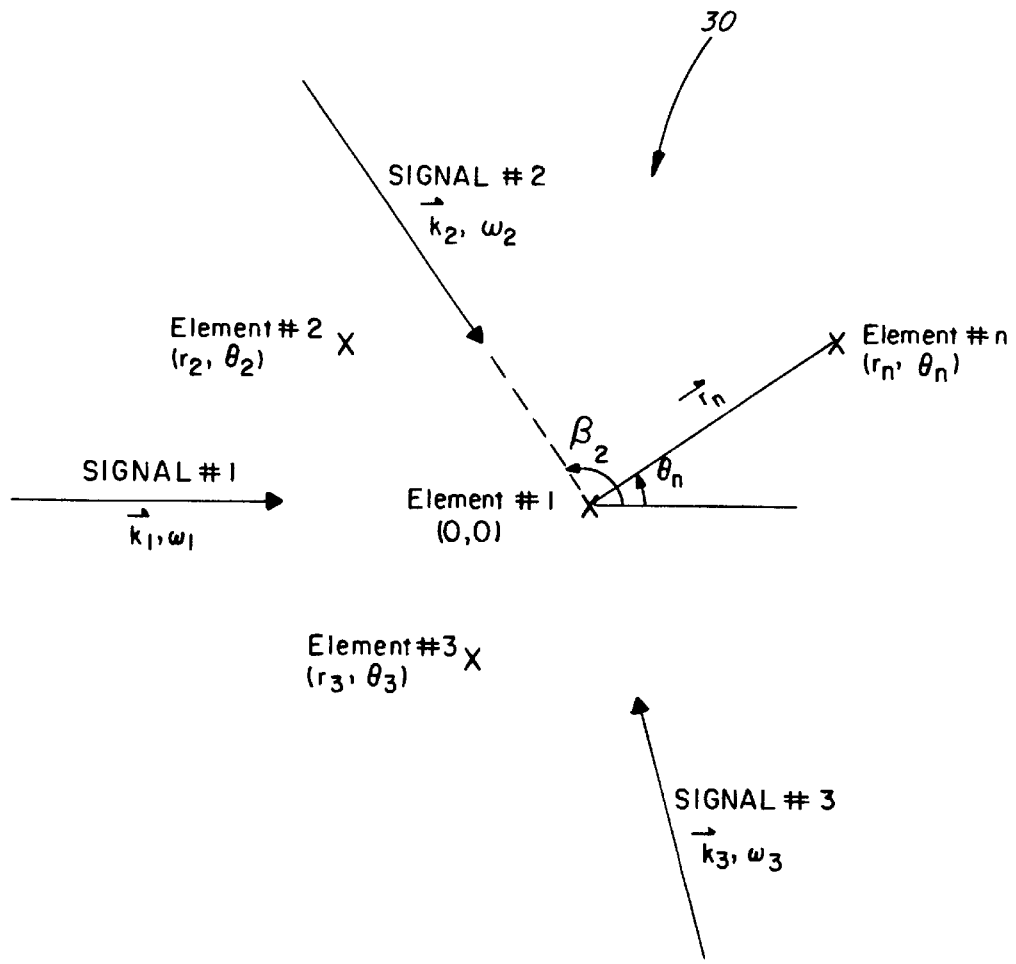
FIG. 2 *Two-dimensional Geometry for Self-cohering a Horizontally Planar Random Array.*

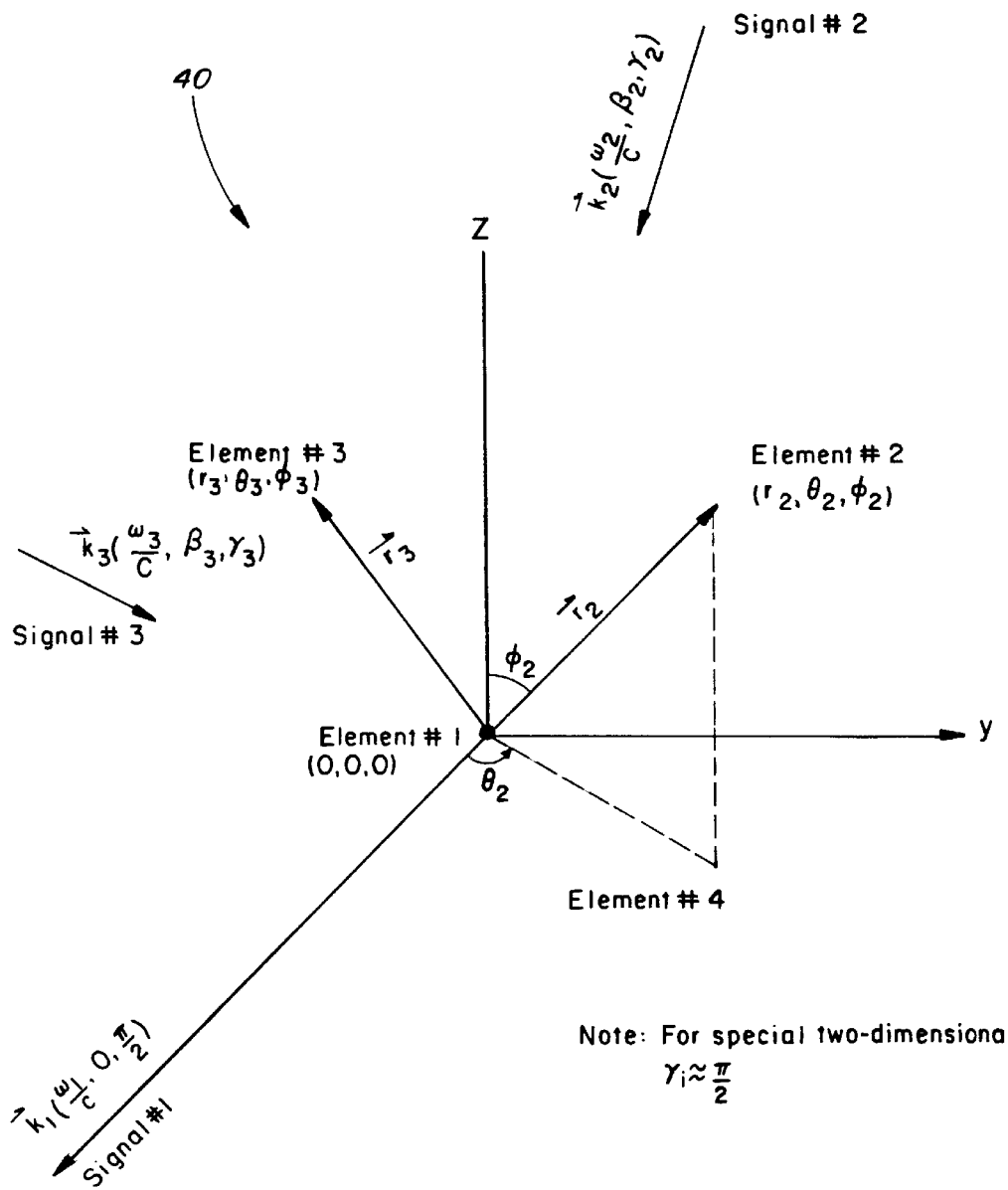
*FIG. 3* Three-dimensional Geometry for Self-cohering an Arbitrary Array.

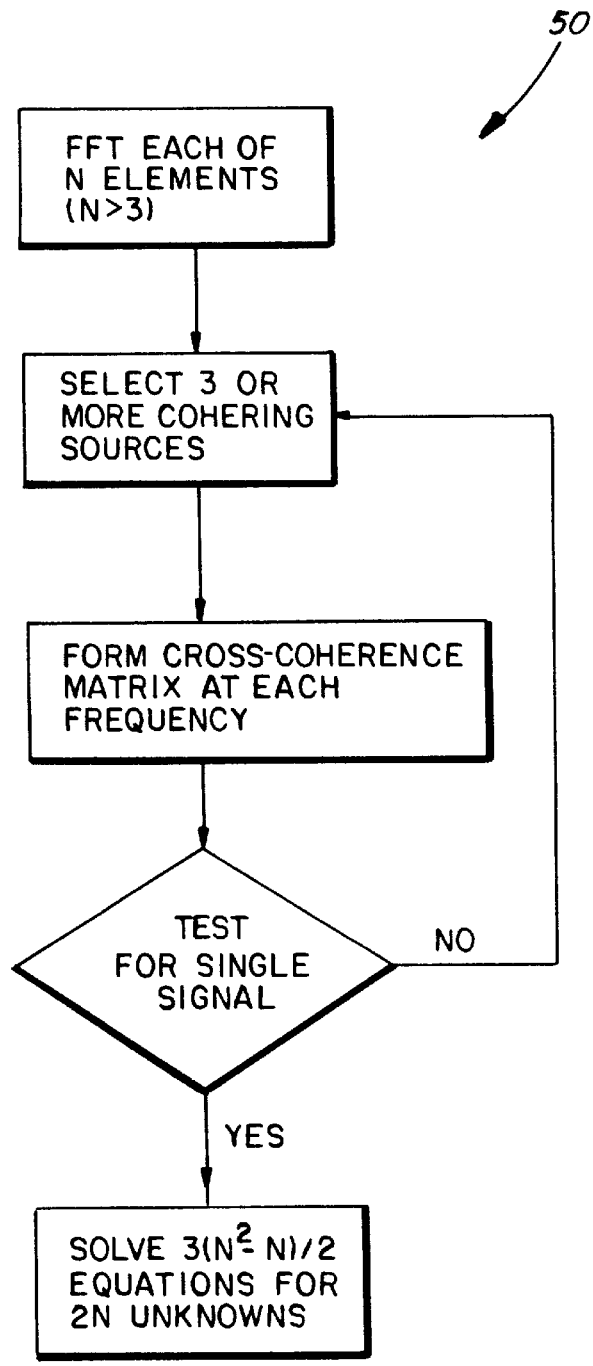
FIG. 4 Flow Diagram of Self-coherency Process.

SELF SURVEY OF RANDOM ARRAYS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein pertains generally to the field of acoustic signal source detection by means of a beam-forming array comprising N(N>3) discrete acoustic sensor elements. More particularly, the invention pertains to such detection wherein a self-cohering method is used to locate the respective positions of the elements in an environment, that is, to a method which employs signals sensed by the sensor elements themselves for sensor position location. Even more particularly, the invention pertains to a self-cohering method of sensor position location which relies on the processing of one or more signals present in the background acoustic field of environment.

Arrays of acoustic sensor elements, such as hydrophones or the like, are extensively used in an acoustic environment such as an ocean body to locate the position or bearing of an acoustic signal source contained therein, and to provide signal to noise gain in an acoustic detection system. Such arrays generally comprise a number of sensor elements. The reception capabilities of individual sensor elements together form a beam or search pattern. Beam forming, the processing of signals to determine the direction or bearing of a signal source from a beam-forming array, and the provision of signal-to-noise gain, is generally based on two assumptions. The first is that all of the sensor elements of the array are known or measured with a separate element location system. The second is that acoustic signals generated by the signal source are always plane waves which have minimal phase distortion over the array.

Great mechanical or electrical simplicity is achieved if the elements are allowed to move and no element location system is required.

In order to determine the actual positions of the sensors at present, a high-frequency pinger or the like may be located in proximity to the array, and the time delays in pinger signal detection may be compared for each of the elements. However, the use of such active signal devices may be undesirable in military applications of a beam-forming array, where a hostile observer may be able to determine array location from the pinger signals. The undesirability is magnified if the array is continuously changing shape, requiring continuous operation of the pinger.

The present invention provides a self-cohering method for continuously determining the actual positions of each of the N sensor elements in an arbitrary beam-forming array to within a preselected error, such as to within one tenth of the wavelength of a received acoustic signal. The method is entirely passive, i.e., it does not require an active signal projecting device in proximity to the array. The invention thereby provides a solution for one of the present major problems in the art.

BACKGROUND INFORMATION

Information substantiating the validity of the mathematics utilized in the method appear in the report entitled "Array Shape Calibrations With Sources in Unknown Locations", by Yosef Rockah and Peter M. Schultheiss, Contract N00014-80-C-0092, July 1985. It is published by the Office of Naval Research, Code 411, Ballston Tower, Arlington, Va. 22203.

SUMMARY OF THE INVENTION

A method for determining the positions of the N array elements of a random array to an accuracy sufficient to accomplish beam forming is provided where the initial positions of the array elements are known to an accuracy of $\lambda_{min/2}$, and where $\lambda_{min}$ is the wavelength of the highest frequency of any of the M cohering source which are in the field of the array and where the relative directions are unknown. The method includes the steps of: identifying M cohering sources in the field of the array each of which emits at least one narrowband frequency, each frequency differing from the adjacent frequency by 1/T, where T is the time period of the measurements; a device for measuring the true bearing of one of the M sources; receiving the M cohering signals at the N array elements; performing a Fast Fourier Transform (FFT) on each of the N element signals; examining the spectrum of each of the N received signals; and from the N spectra, selecting M (M>3) lowest angular frequencies, $\omega_p$ with the strongest signals.

The method also includes at each $\omega_p$ forming the cross coherence matrix using the formula $$\Gamma_{p,mn} = \frac{\langle A_{pm} A_{pn}^* \rangle}{1/N \sum_{n=1}^{N} \langle A_{pn} A_{pn}^* \rangle} \tag{1}$$

where $A_{pn}$ is the complex Fourier coefficient from element n, the symbol pair < > indicating time average for each of the M Frequencies, $\omega_p$; obtaining the equation $$\Gamma_{p,mn} = \exp J \, \omega p/c [\hat{k}_p \cdot (\vec{r}_m - \vec{r}_n)] \tag{2}$$

where $\vec{r}_i$ is the vector position of the ith element, c is the speed of propagation and $\hat{k}_p$ is the unit length direction vector of the pth cohering source; testing and discarding data where Equation (2) is satisfied for all element pairs with the same $\hat{k}_p$; and solving the overdetermined set of Equations (2) for the unknown $\vec{r}_i$ and $\hat{k}_p$.

OBJECTS OF THE INVENTION

An object of the present invention is to provide a new and improved method for passively determining the actual positions of each of the N sensor elements of a beam-forming array which is deployed in an acoustic environment such as a body of water, wherein the method employs acoustic information normally present in the background field of the environment.

Another object is to provide a method for determining the positions of the respective acoustic sensor elements of an arbitrary beam-forming array in an acoustic environment which employs signals generated by a remote or non-local source which lies at a known or readily identifiable bearing from the array.

Yet another object is to provide an improved method for determining the positions of each of the sensor elements of an arbitrary beam-forming array which eliminates the need for deliberately projecting acoustic signals in proximity to the array.

These and other objects of the invention will become more readily apparent from the ensuing specification when taken together with the drawings.

BRIEF DESCRIPTION OF THE DRAWINGS

FIG. 1 is a schematic diagram showing a simplified beam-forming array having a linear shape and receiving planar acoustic waves from an acoustic source.

FIG. 2 is a diagram showing 2-dimensional, planar, geometry for self-cohering a horizontally planar random array.

FIG. 3 is a diagram showing 3dimensional geometry for self-cohering an arbitrary array.

FIG. 4 is a flow diagram illustrating the self-coherency process.

DETAILED DESCRIPTION OF THE PREFERRED EMBODIMENTS

Referring to FIG. 1, therein is shown a beam-forming array and associated equipment 10 comprising discrete sensor elements 12a–d which are not physically coupled together. Discrete sensor elements 12a–d may comprise individual hydrophones or clusters of hydrophones interconnected to form a random, dynamic array 10, according to practices well known in the art. Each sensor element 12a–d may be electrically connected, through a respective variable time delay (TD) element 20a–d, to an adder 22, which provides the sum $V_{total}$ of the amplitudes of the signals sensed by sensor elements 12a–d at a given point in time. Alternatively the sensor element data may be transmitted to the beamformer by telemetry.

If a target source $T_1$ lies at a bearing of θ from array 10, a unique set of adjustments of time delay elements 20a–d will correspond to any particular value of θ, 0°<θ<360°, in order to maximize $V_{total}$ when a signal is projected to the array from the target source. Consequently, to determine the bearing of a target source lying at an unknown location, the delays of elements 20a–d are respectively adjusted in a preselected pattern until $V_{total}$ is maximized, the set of delay values at which maximum $V_{total}$ occurs thereby identifying the bearing θ of the target source.

In the art of acoustic arrays, the process of adjusting delay elements to determine the bearing of a target signal source is known as beam steering. FIG. 1 shows detection beam $\beta_1$, comprising the signal detection pattern of array 10 steered to a bearing of $\theta_1$, and further shows detection beam $\beta_2$, the detection pattern of array 10 steered to a bearing of $\theta_2$. It is to be emphasized that since the beam steering process requires proper adjustment of the respective time delay elements, and since time delay adjustment is critically dependent upon sensor element position, it is essential to be able to accurately determine the respective positions of sensor elements 12a–d. Position should generally be known to within 1/10 of the wavelength of the frequency of a signal received from a target source.

If a signal received by sensors 12a–d is to be processed in the frequency domain, the phase of the signal at respective sensor elements, rather than time delay T, is the quantity of interest in determining bearing angle θ.

There are two embodiments of the invention described herein: one, shown in FIG. 2, in which all the array elements are located in a two-dimensional space or plane; and the other, exemplified by FIG. 3, wherein all the elements are in a three-dimensional space.

The invention involves two methods for determining the positions of elements of a random array using strong signals generated by the cohering sources in the field of the array. Once the positions are known, the beam forming can be accomplished to detect signals at a low signal-to-noise ratio which would otherwise be undetectable.

A random array and a cohering source are herein defined as follows:

Random array: A localized distribution of acoustic receiving elements the location of each of which is measured. The measured positions are used to form beams to improve detection and estimation of bearing of signals incident on the array.

Cohering source: A localized source of sound at unknown bearing and range in the far field of the array emitting a signal (narrow band for this realization) that is received at the array at a signal-to-noise ratio sufficient to be seen in the spectrum of an element.

The following assumptions are made in the description presented herein. A number of them may be able to be relaxed.

1. There are at least three cohering sources. The signal frequencies must differ by 1/T where T is the time period of the measurements. T is typically 300 sec, thus 1/T=3.3 mHz.

2. The signals from the cohering sources are single plane waves.

3. The initial positions of the elements, at the time measurements are taken, are known to an accuracy of $\lambda_{min}/2$, where $\lambda_{min}$ is the wavelength of the highest frequency cohering source. This assumption is required to resolve the modulo-2 redundancy in the phase measurements and to estimate the sign of the relative directions of the cohering sources.

4. The bearing rate of the cohering sources relative to the array coordinate system is negligible over the period of the measurements. This assumption also requires that the array rotation be negligible over the same period.

5. The relative motion of the elements be less $\lambda_{min}/10$ over the measurement period.

6. Means must be provided for measuring the true bearing of one of the cohering sources. This can be done using the gradient directional receiving elements or by the aircraft detecting one of the cohering sources visually or by radar.

7. The array has 3 or more elements.

8. It is assumed that the elements are all in the same plane. However, this restriction can be relaxed.

Consider the geometry shown in FIG. 2. A relative coordinate system is assumed with the origin at Element #1. The orientation of the coordinate system is chosen to be in the direction of cohering Signal #1. Let the position of Element #n be given by $\vec{r}_n(\theta_n)$ and the arrival directions of Signals #2 and #3 be given by $\hat{k}_2$ and $\hat{k}_3$, respectively.

For the purposes of this description, assume that the cohering signals are at different frequencies. The processing is illustrated in FIG. 4. A Fast Fourier Transform (FFT) is applied to each of the received signals at the array elements. The spectra of all the received signals are examined to select a minimum of 3 frequencies with the strongest signals (the cohering signals). The complex Fourier coefficient at frequency $\omega_p$ is given by $$A_{pn} = s_i \exp j\{(\omega_p - \omega_1)t - \hat{k}_i \cdot \vec{r}_n + \alpha_i\} \quad (3)$$

where $s_i$, $k_i$, $\alpha_i$ and $\beta_i$ are the amplitude, wave vector, phase frequency of Source #i; $\omega_p$ is the bin center frequency; and $r_n(r_n, \theta_n)$ is the position of Element #$_n$. At each $\omega_p$ the cross spectral matrix is formed by time averaging $<A_{pm}A_{pn}^*>$.

$$<A_{pm}A_{pn}> = s_i^2 \exp j\{\hat{k}_i \cdot (\vec{r}_m - \vec{r}_n)\} \quad (4)$$

The auto spectrum (m=n) provides an estimate of $s_i^2$. The cross coherence matrix is formed at each source frequency $\omega_P$ by $$\Gamma_{p,mn} = <A_{pm}A_{pn}^*>/<A_{pn}A_{pn}^*> = \exp j\{\hat{k}_i \cdot (\vec{r}_m - \vec{r}_n)\} \quad (5)$$

This calculation provides $(N^2-N)/2$ independent measurements for each frequency, where N is the number of elements. For three signals there are $3(N^2-N)/2$ independent measurements.

Examination of FIG. 2 shows that there are 2N unknowns, i.e. $\beta_2$, $\beta_3$, and $2(N-1)$ element coordinates $(\vec{r}_n, \theta_n)$. For N>3 there are more measurements than unknowns, so the problem can be solved using conventional techniques for the element positions relative to Element #1 and signal arrival angles relative to cohering Signal #1. TABLE 1 hereinbelow shows the number of measurements and unknowns as a function of the number of elements.

TABLE 1

Number of Measurements and Unknowns for 3 Cohering Sources.

| Number of elements N | Number of measurements $3(N^2 - N)/2$ | Number of Unknowns 2N |
|---|---|---|
| 2 | 3 | 4 |
| 3 | 9 | 6 |
| 4 | 18 | 8 |
| . | . | . |
| . | . | . |
| . | . | . |
| 20 | 570 | 40 |

The method for the two-dimensional configuration 30, as shown in FIG. 2, is detailed hereinbelow.

A method for determining the positions to an accuracy sufficient for beamforming of the N elements, N>3, of a random array, where the initial positions of the array elements are known to an accuracy of $\lambda_{min}/2$, where $\lambda_{min}$ is the wavelength of the highest frequency of any of the (M>3) M sources in the field of the array, the relative directions of which are unknown, comprises the steps of:

identifying M cohering sources in the field of the array, each of which emits at least one different narrow-band, frequency, each frequency differing from an adjacent frequency by 1/T, where T is the time period of the measurements;

means for measuring the true bearing of one of the M sources;

receiving the M cohering signals at the N array elements;

performing a Fast Fourier Transform (FFT) on each of the N element signals;

examining the spectrum of each of the N received signals;

from the N examined spectra, selecting the M>3 frequencies, $\omega_p$, with the strongest signals;

at each $\omega_p$, forming the cross coherence matrix by time averaging the product of the complex Fourier coefficients;

forming the cross coherence matrix at each source frequency $\omega_p$ by using the formula:

$$\Gamma_{p,mn} = \frac{\langle A_{pm} A_{pn}^* \rangle}{\frac{1}{N}\sum_{n=1}^{N} \langle A_{pn} A_{pn}^* \rangle} \quad (6)$$

where $A_{pn}$ is the complex Fourier coefficient from element n;

for each of the M frequencies, $\omega_p$, obtaining the equation $$\Gamma_{p,mn} = \exp j\, \omega_{p/c}\{\hat{k}_p \cdot (\vec{r}_m - \vec{r}_n)\} \quad (7)$$

where $\vec{r}_i$ is the position of the ith element, $\omega_p$ is the angular frequency, c is the speed of propagation and $\hat{k}_p$ is the direction vector of the pth cohering source;

testing and discarding data where $\hat{k}_p$'s are the same; and solving the overdetermined set of equations for the unknowns $\vec{r}_i$, $\hat{k}_p$.

For the three-dimensional embodiment 40, shown in FIG. 3, the parameters described hereinabove in connection with the planar embodiment 30, shown in FIG. 2, change.

Examination of FIG. 3 shows that there are 3N+1 unknowns, i.e. $\beta_2$, $\alpha_2$, $\beta_3$, $\alpha_3$ and $3(N-1)$ element coordinates $(r_n, \theta_n, \phi_n)$. For N>3 there are more measurements than unknowns so the problem can be solved using conventional techniques for the element positions relative to Element #1 and signal arrival angles relative to cohering Signal #1. TABLE 2 shows the number of measurements and unknowns as a function of the number of elements.

TABLE 2

Number of measurements and unknowns for 3 cohering sources.

| Number of Elements N | Number of measurements $3(N^2 - N)/22$ | Number of Unknowns 3N + 1 |
|---|---|---|
| 2 | 3 | 7 |
| 3 | 9 | 10 |
| 4 | 18 | 13 |
| . | . | . |
| . | . | . |
| . | . | . |
| 20 | 570 | 61 |

The procedure described hereinabove does not provide the geographical position of the array or the orientation of the coordinate system relative to true north. The position can be obtained to the required accuracy from knowledge of where the elements of the array were deployed. The orientation can be obtained by identifying the true bearing of one of the cohering sources by visual or radar means or by storing DIFAR hydrophones in the array and measuring the bearing.

The method for the three-dimensional configuration 40, as shown in FIG. 4, is described hereinbelow.

A method for determining the positions of the N array elements of a random array to an accuracy sufficient to accomplish beamforming, where the initial positions of the array elements are known to an accuracy of $\lambda_{min}/2$, where $\lambda_{min}$ is the wavelength of the highest frequency of any of the M cohering sources which are in the field of the array, the relative directions of which are unknown, the method comprises the step of:

identifying M cohering sources in the field of the array, each of which emits at least one narrowband frequency, each frequency differing from the adjacent frequency by 1/T, where T is the time period of the measurements;

means for measuring the true bearing of one of the M sources;

receiving the M cohering signals at the N array elements;

performing a Fast Fourier Transform (FFT) on each of the N element signals;

examining the spectrum of each of the N received signals;

from the N spectra, selecting M (M>3) lowest angular frequencies, $\omega_p$ with the strongest signals;

at each $\omega_p$, forming the cross coherence matrix using the formula $$\Gamma_{p,mn} = \frac{\langle A_{pm} A_{pn}^* \rangle}{\frac{1}{N}\sum_{n=1}^{N} \langle A_{pn} A_{pn}^* \rangle} \qquad (8)$$

where $A_{pn}$ is the complex Fourier coefficient from element n, they symbol pair indicating time average, for each of the M Frequencies, $\omega_p$;

obtaining the equation $$\Gamma_{p,mn} = \exp\left(j\omega_p/c\right)[\hat{k}_p \cdot (\vec{r}_m - \vec{r}_n)] \qquad (9)$$

where $\vec{r}_i$ is the vector position of the ith element, c is the speed of propagation and $\hat{k}_p$ is the unit length direction vector of the pth cohering source;

testing and discarding data where Equation (2) is satisfied for all element pairs with the same $\hat{k}_p$; and solving the overdetermined set of Equations (2) for the unknown $r_i$ and $k_p$, which can be accomplished for the conditions described hereinbelow.

p,mn is a unitary Hermitian matrix and has $(N^2-N)/2$ independent matrix components. M such matrices, one for each o the M sources, provides $M(N^2-N)/2$ independent equations under the assumption that no $k_p$'s are equal.

N element positions have $3(N-1)$ unknowns if the position of one of the elements is assumed to be the origin. The exact position of this origin is not required for beamforming. It is obtained to sufficient accuracy by knowledge of where the array was deployed. Each of the M cohering source directions have two unknown angles. If the orientation of the coordinate system is assumed to be in the direction of one of the cohering sources, there are $2(M-1)$ unknowns. The total number of unknowns is given by the equation $$N_u = 3(N-1) + 2(M-2) = 3N + 2M - 5 \qquad (10)$$

The number of equations exceeds the number of unknowns when $$M(N^2-N)/2 > 3N + 2M - 5 \qquad (11)$$

which occurs for N=3, M=4 or for N=4, M=3.

SPECIAL CASES:

I. When acoustic signals travel in the deep ocean at low frequencies, all signals travel near horizontal, reducing the number of possible arrival directions to M−1. In this case, equation (11) becomes $$M(N^2-N)/2 = 3N + M - 4 \qquad (12)$$

which can be solved in all cases N>3 and M>3.

II. Also, in ocean acoustic applications, the depth of the array elements is often known, since they are either suspended from a float or buoyed from the bottom. In this case, the number of element unknown parameters $2(N-1)$ and equation (12) becomes $$M(N^2-N)/2 = 2N + 2M - 4 \qquad (13)$$

which again can be solved for all cases N>3 and M>3.

Conditions where Equation (9) can be solved is given hereinbelow.

$\Gamma_{p,mn}$ is a unitary hermitian matrix and has $(N^2-N)/2$ independent matrix components. M such matrices, one for each of M sources, provides $M(N^2-N)/2$ independent equations (under the assumption that no $\hat{k}_p$'s are not equal).

N element positions have $3(N-1)$ unknowns if the position of one of the elements is assumed to be the origin. The exact position of this origin is not needed for beam forming. It is obtained to sufficient accuracy by knowledge of where the array was deployed. Each M cohering source direction have two unknown angles. If the orientation of the coordinate system is assumed to be in the direction of one of the cohering sources there are $2(M-1)$ unknowns. The total number of unknowns is $3(N-1)-2(M-1)=3N+2M-5$ unknowns.

The number of equations exceeds the number of unknowns when $$M(N^2-N)/2 > 3N + 2M - 5 \qquad (11)$$

TABLE 3 summarizes the conditions for a solution from Equation 11.

| Number of elements | Min. No. of Sources |
|---|---|
| 3 | 4 |
| 4 | 2 | at least three sources in different directions are required.

Special Cases:

I. In the deep ocean at low frequencies, all signals tend to travel horizontally, reducing the number of possible arrival directions to M−1. In this case, Equation (11) becomes $$M(N^2-N)/2 > 3N + 2M - 4 \qquad (14)$$

which can be solved for all cases of N>3, M>3.

II. Often in ocean acoustic applications the depth of the array elements is known, since they are either suspended from a float or buoyed from the bottom. In this case, the number of element unknowns becomes $2(N-1)$ and Equation (11) becomes $$M(N^2-N)/2 > 2N + 2M - 4 \qquad (15)$$

which can be solved for all cases when M>3 and N>3.

Obviously, many modifications and variations of the present invention are possible in the light of the above teachings. It is therefore to be understood that within the scope of the appended claims the invention may be practiced otherwise than as specifically described.

I claim:

1. A method of determining the positions of each of the array elements of a random array wherein said array has N array elements to an accuracy sufficient to accomplish beamforming, where the initial positions of the array elements are known to an accuracy of $\lambda_{min}/2$, where $\lambda_{min}$ is the wavelength of the highest frequency of any of M cohering sources wherein M is the number of cohering sources in the field of the array, the relative directions of which are unknown, the method comprising the steps of:

identifying M cohering sources in the field of the array, each of which emits at least one narrowband frequency, each frequency differing from the adjacent frequency by 1/T, where T is the time period of the measurement;

means for measuring the true bearing of one of the M sources;

receiving the M cohering signals at the N array elements;

receiving the M cohering signals at the N array elements;

performing a Fast Fourier Transform (FFT) on each of the N element signals;

examining the spectrum of each of the N received signals;

from the N spectra, selecting M (M>3) lowest angular frequencies, $\omega_p$, with the strongest signals;

at each $\omega_p$, forming the cross coherence matrix using the formula $$\Gamma_{p,mn} = \frac{\langle A_{pm} A_{pn}^* \rangle}{\frac{1}{N} \sum_{n=1}^{N} \langle A_{pn} A_{pn}^* \rangle} \quad (1)$$

where $A_{pn}$ is the complex Fourier coefficient from element n, the symbol pair indicating time average, for each of the M frequencies, $\omega_p$, and where $A_{pm}$ is the complex Fourier coefficient from element M;

obtaining the equation $$\Gamma_{p,mn} = \exp(j\,\omega_p/c)[\hat{k}_p \cdot (\vec{r}_m - \vec{r}_n)] \quad (2)$$

where $\vec{r}_i$ is the vector position of the ith element, where $\vec{r}_m$ is the vector position of the mth element, c is the speed of propagation and $\hat{k}_p$ is the unit length direction vector of the pth cohering source;

testing and discarding data where Equation (2) is satisfied for all element pairs with the same $\hat{k}_p$; and solving the overdetermined set of Equations (2) for the unknown $\vec{r}_i$ and $\hat{k}_p$.

2. A method for determining the positions to an accuracy sufficient for beamforming of the N elements, N>3, of a random array, where N is the number of elements in said random array, where the initial positions of the array elements are known to an accuracy of $\lambda_{min}/2$, where $\lambda_{min}$ is the wavelength of the highest frequency of any of the (M>3) M sources in the field of the array, where M is the number of sources in the field of the array, the relative directions of which are unknown, the method comprising the steps of:

identifying M cohering sources in the field of the array, each of which emits at least one different narrow-band, frequency, each frequency differing from an adjacent frequency by 1/T, where T is the time period of the measurements;

means for measuring the true bearing of one of the M sources;

receiving the M cohering signals at the N array elements;

performing a Fast Fourier Transform (FFT) on each of the N element signals;

examining the spectrum of each of the N received signals;

from the N examined spectra, selecting the M>3 frequencies, $\omega_p$, with the strongest signals;

at each $\omega_p$, forming the cross coherence matrix by time averaging the product of the complex Fourier coefficients;

forming the cross coherence matrix at each source frequency $\omega_p$ by using the formula:

$$\Gamma_{p,mn} = \frac{\langle A_{pm} A_{pn}^* \rangle}{1/N \sum_{n=1}^{N} \langle A_{pn} A_{pn}^* \rangle} \quad (3)$$

where $A_{pn}$ is the complex Fourier coefficient from element n and where $A_{pm}$ is the complex Fourier coefficient from element m;

for each of the M frequencies, p, obtaining the equation $$\Gamma_{p,mn} = \exp(j\,\omega_p/c)[\hat{k}_p \cdot (\vec{r}_m - \vec{r}_n)] \quad (4)$$

where $\vec{r}_n$ is the position of the ith element, and where $\vec{r}_m$ is the position of the mth element, $\omega_p$ is the angular frequency, c is the speed of propagation and $\hat{k}_p$ is the direction vector of the pth cohering source;

testing and discarding data where $k_p$'s are the same; and solving the overdetermined set of equations for the unknown $\vec{r}_i$, $\hat{k}_p$.

* * * * *